(12) United States Patent
Yamada et al.

(10) Patent No.: US 11,310,760 B2
(45) Date of Patent: Apr. 19, 2022

(54) TERMINAL APPARATUS, LOCATION SERVER, AND COMMUNICATION METHOD

(71) Applicants: SHARP KABUSHIKI KAISHA, Sakai (JP); FG Innovation Company Limited, Tuen Mun (HK)

(72) Inventors: Ryota Yamada, Sakai (JP); Hiromichi Tomeba, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/255,735

(22) PCT Filed: May 31, 2019

(86) PCT No.: PCT/JP2019/021866
§ 371 (c)(1),
(2) Date: Dec. 23, 2020

(87) PCT Pub. No.: WO2020/003896
PCT Pub. Date: Jan. 2, 2020

(65) Prior Publication Data
US 2021/0282111 A1 Sep. 9, 2021

(30) Foreign Application Priority Data
Jun. 28, 2018 (JP) .............................. JP2018-123022

(51) Int. Cl.
*H04L 27/26* (2006.01)
*H04L 5/00* (2006.01)
(Continued)

(52) U.S. Cl.
CPC ......... *H04W 64/003* (2013.01); *H04L 5/0051* (2013.01); *H04L 27/26025* (2021.01); *H04W 24/10* (2013.01); *H04W 56/005* (2013.01)

(58) Field of Classification Search
CPC . G01S 5/06; G01S 5/10; G01S 5/0027; G01S 5/0036; H04B 7/0617;
(Continued)

(56) References Cited

U.S. PATENT DOCUMENTS

2017/0289953 A1   10/2017  Chae
2017/0366244 A1*  12/2017  Lee ..................... H04B 7/0619

FOREIGN PATENT DOCUMENTS

WO        2016/099546 A1    6/2016

OTHER PUBLICATIONS

3rd Generation Partnership Project, Technical Specification Group Radio Access Network, Evolved Universal Terrestrial Radio Access (E-UTRA), LTE Positioning Protocol (LPP), (Release 14), 3GPP TS 36.355 V14.5.1 (2018-04).

* cited by examiner

*Primary Examiner* — Melvin C Marcelo
*Assistant Examiner* — Natali Pascual Peguero
(74) *Attorney, Agent, or Firm* — ScienBiziP, P.C.

(57) ABSTRACT

A terminal apparatus, a location server, and methods for performing positioning measurement are provided. A terminal apparatus includes: a receiver configured to receive a PRS configuration from a location server; receive a first PRS resource from a serving cell and a second PRS resource from a neighboring cell based on the PRS resource configuration; and a position measuring unit configured to determine a RSTD based the reception timing(s) of the first PRS resource and/or second PRS resource; wherein the first PRS resource and the second PRS resource are configured with a first subcarrier spacing and a second subcarrier spacing respectively; the first PRS resource and the second PRS resource are configured with their corresponding QCL information for determining their corresponding spatial receiving filter for receiving the first PRS resource and the second PRS (Continued)

(a) EXAMPLE OF ESTIMATION RESULT IN FIRST PRS RESOURCE (b) EXAMPLE OF ESTIMATION RESULT IN SECOND PRS RESOURCE (c) EXAMPLE OF ESTIMATION RESULT IN THIRD PRS RESOURCE resource by the terminal apparatus respectively; the first QCL information is different from the second QCL information.

12 Claims, 8 Drawing Sheets

(51) Int. Cl.
*H04W 24/10* (2009.01)
*H04W 56/00* (2009.01)
*H04W 64/00* (2009.01)

(58) Field of Classification Search
CPC ............ H04L 27/26025; H04L 5/0051; H04L 27/261; H04L 5/001; H04W 16/28; H04W 24/10; H04W 56/005; H04W 64/00; H04W 64/003; H04W 64/006
See application file for complete search history.

(a) EXAMPLE OF ESTIMATION RESULT IN FIRST PRS RESOURCE (b) EXAMPLE OF ESTIMATION RESULT IN SECOND PRS RESOURCE (c) EXAMPLE OF ESTIMATION RESULT IN THIRD PRS RESOURCE

TERMINAL APPARATUS, LOCATION SERVER, AND COMMUNICATION METHOD

CROSS-REFERENCE TO RELATED APPLICATION(S)

The present application is the national phase of PCT international application No. PCT/JP2019/021866, which claims the benefits of and priorities under 35 U.S.C. § 119 on Japan Patent Application Serial No. 2018-123022 filed on Jun. 28, 2018 entitled "TERMINAL DEVICE, LOCATION SERVER AND METHOD" which is hereby incorporated fully by reference into the present application.

TECHNICAL FIELD

The present invention relates to a terminal apparatus, a location server, and a communication method. This application claims priority based on JP 2018-123022 filed on Jun. 28, 2018, the contents of which are incorporated herein by reference.

BACKGROUND ART

Research and development activities related to the 5th generation mobile radio communication system (5G system) have been actively carried out, aiming to start commercial services around the year 2020. A vision recommendation on the standard system of the 5G system (International mobile telecommunication-2020 and beyond: IMT-2020) was recently reported (see NPL 1) by the International Telecommunication Union Radio communications Sector (ITU-R), which is an international standardization body.

Position information of terminal apparatuses is considered to be applied to various services, and further improvement on accuracy is required.

In NR, which is a 5G system of the 3GPP, beamforming by multiple antennas has been adopted, and it is expected that position information of terminal apparatuses becomes highly accurate (see NPL 2).

CITATION LIST

Non Patent Literature

NPL 1: "IMT Vision—Framework and overall objectives of the future development of IMT for 2020 and beyond," Recommendation ITU-R M. 2083-0, September 2015.

NPL 2: Intel, "Study on NR Positioning Support" RP-181399, June, 2018.

SUMMARY OF INVENTION

Technical Problem

However, beamforming employed in 3GPP NR is a technology for data communication, and it is difficult to use the beamforming as is for improving the accuracy of position information.

One aspect of the present invention has been made in view of such circumstances, and an object of the present invention is to provide a terminal apparatus, a location server, and a method that improve position estimation accuracy by using beamforming.

Solution to Problem

To address the above-mentioned drawbacks, a base station apparatus, a terminal apparatus, and a communication method according to an aspect of the present invention are configured as follows.

A terminal apparatus according to an aspect of the present invention includes: a receiver configured to: receive a positioning reference signal (PRS) resource configuration from a location server; receive a first PRS resource from a serving cell based on the PRS resource configuration; and receive a second PRS resource from a neighboring cell based on the PRS resource configuration; and a position measuring unit configured to: determine a reference signal time difference (RSTD) at least based on one of a reception timing of the first PRS resource and a reception timing of the second PRS resource; wherein the first PRS resource is configured with a first subcarrier spacing and the second PRS resource is configured with a second subcarrier spacing; the first PRS resource is configured with a first Quasi co-located (QCL) information for determining a first spatial receiving filter for receiving the first PRS resource by the terminal apparatus; the second PRS resource is configured with a second QCL information for determining a second spatial receiving filter for receiving the second PRS resource by the terminal apparatus; the first QCL information being different from the second QCL information.

In the terminal apparatus according an aspect of the present invention, the first PRS resource and the second PRS resource are repeated for a plurality of time with respective QCL information unchanged; the first PRS resource and the second PRS resource are transmitted based on different radio access technologies.

In the terminal apparatus according an aspect of the present invention, a value of the first subcarrier spacing is different from a value of the second subcarrier spacing.

A method for a location server according to an aspect of the present invention includes: receiving, from a base station, a first positioning reference signal (PRS) configuration for a first base station transmit point and a second PRS configuration for a second base station transmit point; and transmitting, to the terminal apparatus, a third PRS configuration, wherein the third PRS configuration includes: a first PRS resource determined from the first PRS configuration, the first PRS resource is configured with a first subcarrier spacing and a first Quasi co-located (QCL) information; and a second PRS resource determined from the second PRS configuration, the second PRS resource is configured with a second subcarrier spacing and a second QCL information.

In the method for the location server according to an aspect of the present invention, the first PRS resource and the second PRS resource are repeated for a plurality of time with respective QCL information unchanged; the first PRS resource and the second PRS resource are transmitted based on different radio access technologies.

In the method for the location server according to an aspect of the present invention, a value of the first subcarrier spacing is different from a value of the second subcarrier spacing.

A method according to an aspect of the present invention is a method in a terminal apparatus, the method including: receiving, from a location server, a PRS resource configuration; receiving, from a serving cell based on the PRS resource configuration, a first PRS resource; and receiving, from a neighboring cell based on the PRS resource configuration, a second PRS resource; and determining, a RSTD at least based on one of a reception timing of the first PRS resource and a reception timing of the second PRS resource; wherein the first PRS resource is configured with a first subcarrier spacing and the second PRS resource is configured with a second subcarrier spacing; the first PRS resource is configured with a first QCL information for determining a first spatial receiving filter for receiving the first PRS resource by the terminal apparatus; the second PRS resource is configured with a second QCL information for determining a second spatial receiving filter for receiving the second PRS resource by the terminal apparatus; the first QCL information being different from the second QCL information.

Advantageous Effects of Invention

According to an aspect of the present invention, the position estimation accuracy can be improved by using beamforming.

DESCRIPTION OF EMBODIMENTS

A communication system according to the present embodiment includes a base station apparatus (a transmitter, cells, a transmission point, a group of transmit antennas, a group of transmit antenna ports, component carriers, eNodeB, transmission point, transmission and/or reception point, transmission panel, access point, subarray), terminal apparatuses (a terminal, a mobile terminal, a reception point, a reception terminal, a receiver, a group of receive antennas, a group of receive antenna ports, UE, reception point, reception panel, station, subarray), and a location server. The location server includes, for example, an Enhanced Serving Mobile Location Centre (E-SMLC), a Secure User Plane Location (SUPL), and a SUPL Location Platform (SLP). A base station apparatus connected to a terminal apparatus (base station apparatus that establishes a radio link with a terminal apparatus) is also referred to as a serving cell.

The base station apparatus and the terminal apparatus in the present embodiment can communicate in a licensed band and/or an unlicensed band.

According to the present embodiments, "X/Y" includes the meaning of "X or Y". According to the present embodiments, "X/Y" includes the meaning of "X and Y". According to the present embodiments, "X/Y" includes the meaning of "X and/or Y".

Figure 1:
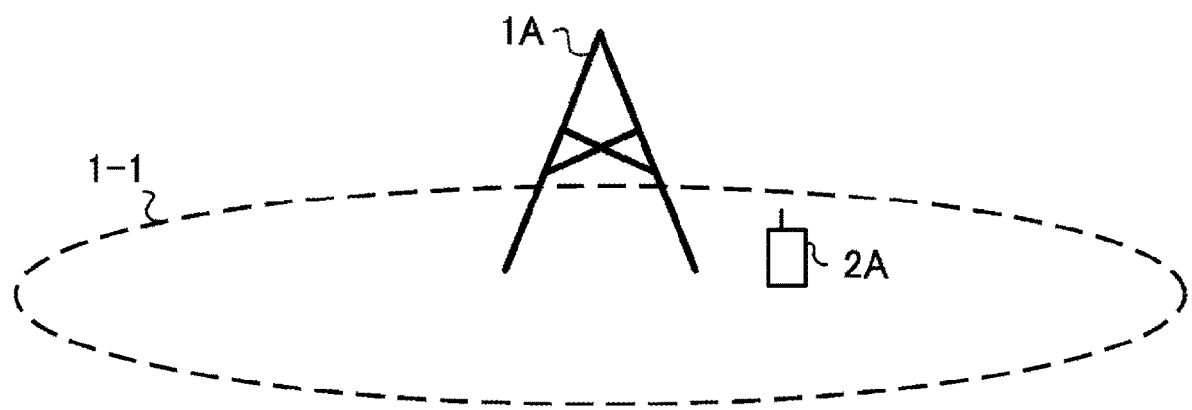
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and a terminal apparatus 2A. A coverage 1-1 is a range (a communication area) in which the base station apparatus 1A can connect to the terminal apparatus. The base station apparatus 1A is also simply referred to as a base station apparatus. The terminal apparatus 2A is also simply referred to as a terminal apparatus.

With respect to FIG. 1, the following uplink physical channels are used for uplink radio communication from the terminal apparatus 2A to the base station apparatus 1A. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The Uplink Control Information includes a positive acknowledgement (ACK) or a negative acknowledgement (NACK) (ACK/NACK) for downlink data (a downlink transport block or a Downlink-Shared Channel (DL-SCH)). ACK/NACK for the downlink data is also referred to as HARQ-ACK or HARQ feedback.

Here, the Uplink Control Information includes Channel State Information (CSI) for the downlink. The Uplink Control Information includes a Scheduling Request (SR) used to request an Uplink-Shared Channel (UL-SCH) resource. The Channel State Information refers to a Rank Indicator (RI) for specifying a preferable spatial multiplexing number, a Precoding Matrix Indicator (PMI) for specifying a preferable precoder, a Channel Quality Indicator (CQI) for specifying a preferable transmission rate, a CSI-Reference Signal (RS) Resource Indicator (CRI) for specifying a preferable CSI-RS resource, a Layer 1-Reference Signal Received Power (L1-RSRP) measured by CSI-RS or Synchronization Signal (SS), and the like.

The Channel Quality Indicator (hereinafter, referred to as a CQI value) can be a preferable modulation scheme (e.g., QPSK, 16 QAM, 64 QAM, 256 QAM, or the like) and a preferable coding rate in a prescribed band (details of which will be described later). The CQI value can be an index (CQI Index) determined by the above modulation scheme and coding rate. The CQI value can take a value predetermined in the system.

The CRI indicates a CSI-RS resource whose received power/received quality is suitable from multiple CSI-RS resources.

Note that the Rank Indicator and the Precoding Quality Indicator can take the values predetermined in the system. The Rank Indicator and the Precoding Matrix Indicator can be an index determined by the number of spatial multiplexing and Precoding Matrix information. Note that some or all of the CQI values, PMI values, RI values, and CRI values are also collectively referred to as "CSI values".

PUSCH is used for transmission of uplink data (an uplink transport block, UL-SCH). PUSCH may be used for transmission of ACK/NACK and/or Channel State Information along with the uplink data. PUSCH may be used to transmit the uplink control information only.

PUSCH is used to transmit an RRC message. The RRC message is a signal/information that is processed in a Radio Resource Control (RRC) layer. PUSCH is used to transmit an MAC Control Element (CE). Here, MAC CE is a signal/information that is processed (transmitted) in a Medium Access Control (MAC) layer.

For example, a power headroom may be included in MAC CE and may be reported via PUSCH. In other words, a MAC CE field may be used to indicate a level of the power headroom.

The PRACH is used to transmit a random access preamble.

In the uplink radio communication, an Uplink Reference Signal (UL RS) is used as an uplink physical signal. The uplink physical signal is not used for transmission of information output from higher layers, but is used by the physical layer. The Uplink Reference Signal includes a Demodulation Reference Signal (DMRS), a Sounding Reference Signal (SRS), and a Phase-Tracking reference signal (PT-RS).

The DMRS is associated with transmission of the PUSCH or the PUCCH. For example, the base station apparatus 1A uses DMRS in order to perform channel compensation of PUSCH or PUCCH. For example, the base station apparatus 1A uses SRS to measure an uplink channel state. The SRS is used for uplink observation (sounding). The PT-RS is used to compensate for phase noise. Note that the DMRS of the uplink is also referred to as uplink DMRS.

In FIG. 1, the following downlink physical channels are used for the downlink radio communication from the base station apparatus 1A to the terminal apparatus 2A. The downlink physical channels are used for transmitting information output from the higher layer.

Physical Broadcast Channel (PBCH)
Physical Control Format Indicator Channel (PCFICH)
Physical Hybrid automatic repeat request Indicator Channel (PHICH); HARQ indication channel
Physical Downlink Control Channel (PDCCH)
Enhanced Physical Downlink Control Channel (EPDCCH)
Physical Downlink Shared Channel (PDSCH)

The PBCH is used for broadcasting a Master Information Block (MIB, a Broadcast Channel (BCH)) that is used commonly by the terminal apparatuses. PCFICH is used for transmission of information for indicating a region (e.g., the number of Orthogonal Frequency Division Multiplexing (OFDM) symbols) to be used for transmission of PDCCH. Note that the MIB is also referred to as a minimum system information.

PHICH is used for transmission of ACK/NACK with respect to uplink data (a transport block, a codeword) received by the base station apparatus 1A. In other words, PHICH is used for transmission of a HARQ indicator (HARQ feedback) for indicating ACK/NACK with respect to the uplink data. Note that ACK/NACK is also called HARQ-ACK. The terminal apparatus 2A reports ACK/NACK having been received to a higher layer. ACK/NACK refers to ACK for indicating a successful reception, NACK for indicating an unsuccessful reception, and DTX for indicating that no corresponding data is present. In a case that PHICH for uplink data is not present, the terminal apparatus 2A reports ACK to a higher layer.

The PDCCH and the EPDCCH are used to transmit Downlink Control Information (DCI). Here, multiple DCI formats are defined for transmission of the downlink control information. To be more specific, fields for the downlink control information are defined in a DCI format and are mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for PDSCH, and a Transmit Power Control (TPC) command for PUCCH. Here, the DCI format for the downlink is also referred to as downlink grant (or downlink assignment).

For example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of MCS for PUSCH, and a TPC command for PUSCH. Here, the DCI format for the uplink is also referred to as uplink grant (or uplink assignment).

The DCI format for the uplink can be used to request Channel State Information (CSI; also referred to as received quality information) for the downlink (CSI request).

The DCI format for the uplink can be used for indicating an uplink resource to which a CSI feedback report is mapped, where the CSI feedback report is fed back to the base station apparatus by the terminal apparatus. For example, the CSI feedback report can be used for indicating an uplink resource that periodically reports Channel State Information (Periodic CSI). The CSI feedback report can be used for deciding a mode configuration (CSI report mode) for periodically reporting the Channel State Information.

For example, the CSI feedback report can be used for indicating an uplink resource that reports aperiodic Channel State Information (Aperiodic CSI). The CSI feedback report can be used for deciding a mode configuration (CSI report mode) for aperiodically reporting the Channel State Information.

For example, the CSI feedback report can be used for indicating an uplink resource that reports semi-persistent Channel State Information (semi-persistent CSI). The CSI feedback report can be used for deciding a mode configuration (CSI report mode) for semi-persistently reporting the Channel State Information. Note that the semi-persistent CSI report is to periodically perform CSI reporting in a period since activated with higher layer signaling or downlink control information until deactivated.

The DCI format for the uplink can be used for indicating a type of the CSI feedback report that is fed back to the base station apparatus by the terminal apparatus. The type of the CSI feedback report includes wideband CSI (e.g., Wideband CQI), narrowband CSI (e.g., Subband CQI), and the like.

In a case that a PDSCH resource is scheduled in accordance with the downlink assignment, the terminal apparatus receives downlink data on the scheduled PDSCH. In a case that a PUSCH resource is scheduled in accordance with the uplink grant, the terminal apparatus transmits uplink data and/or uplink control information on the scheduled PUSCH.

The PDSCH is used to transmit the downlink data (the downlink transport block, DL-SCH). PDSCH is used to transmit a system information block type 1 message. The system information block type 1 message is cell-specific information.

The PDSCH is used to transmit a system information message. The system information message includes a system information block X other than the system information block type 1. The system information message is cell-specific information.

PDSCH is used to transmit an RRC message. Here, the RRC message transmitted from the base station apparatus may be shared by multiple terminal apparatuses in a cell. The RRC message transmitted from the base station apparatus 1A may be a dedicated message to a given terminal apparatus 2A (also referred to as dedicated signaling). In other words, user equipment specific (user equipment unique) information is transmitted by using the message dedicated to the certain terminal apparatus. PDSCH is used to transmit MAC CE.

Here, the RRC message and/or MAC CE is also referred to as higher layer signaling.

PDSCH can be used to request downlink channel state information. PDSCH can be used for transmission of an uplink resource to which a CSI feedback report is mapped, the CSI feedback report being fed back to the base station apparatus by the terminal apparatus. For example, the CSI feedback report can be used for indicating an uplink resource that periodically reports Channel State Information (Periodic CSI). The CSI feedback report can be used for deciding a mode configuration (CSI report mode) for periodically reporting the Channel State Information.

The type of the downlink Channel State Information report includes wideband CSI (e.g., Wideband CSI) and narrowband CSI (e.g., Subband CSI). The wideband CSI calculates one piece of Channel State Information for the system band of a cell. The narrowband CSI divides the system band in prescribed units, and calculates one piece of Channel State Information for each division.

In the downlink radio communication, a Synchronization signal (SS) and a Downlink Reference Signal (DL RS) are used as downlink physical signals. The downlink physical signals are not used for transmission of information output from the higher layers, but are used by the physical layer. Note that synchronization signals include Primary Synchronization Signals (PSSs) and Secondary Synchronization Signals (SSSs).

The synchronization signal is used for the terminal apparatus to take synchronization in the frequency domain and the time domain in the downlink. The synchronization signal is also used to measure received power, received quality, or a Signal-to-Interference and Noise power Ratio (SINR). Note that the received power measured by the synchronization signal is also referred to as a Synchronization Signal-Reference Signal Received Power (SS-RSRP), the received quality measured by the synchronization signal is also referred to as a Reference Signal Received Quality (SS-RSRQ), and the SINR measured by the synchronization signal is also referred to as a SS-SINR. Note that the SS-RSRQ is a ratio between the SS-RSRP and an Received Signal Strength Indicator (RSSI). The RSSI is the total average received power for a certain observation period. The synchronization signal/Downlink Reference Signal is used for the terminal apparatus to perform channel compensation on a downlink physical channel. For example, the synchronization signal/Downlink Reference Signal is used for the terminal apparatus to calculate the downlink Channel State Information.

Here, the downlink reference signal includes a Demodulation Reference Signal (DMRS), a Non-Zero Power Channel State Information-Reference Signal (NZP CSI-RS), a Zero Power Channel State Information-Reference Signal (ZP CSI-RS), a PT-RS, a Tracking Reference Signal (TRS), and a Positioning Reference Signal (PRS). Note that the DMRS of the downlink is also referred to as a downlink DMRS. Note that in the following embodiments, the NZP CSI-RS and/or the ZP CSI-RS are included in a case of simply referred to as a CSI-RS.

The DMRS is transmitted in a subframe and a band that are used for transmission of the PDSCH/PBCH/PDCCH/EPDCCH to which the DMRS relates, and is used to demodulate the PDSCH/PBCH/PDCCH/EPDCCH to which the DMRS relates.

A resource for NZP CSI-RS is configured by the base station apparatus 1A. For example, the terminal apparatus 2A performs signal measurement (channel measurement) or interference measurement by using the NZP CSI-RS. The NZP CSI-RS is also used for beam recovery or the like to perform recovery in a case that the received power/received quality in a beam direction or beam scanning seeks a suitable beam direction deteriorates. A resource for ZP CSI-RS is configured by the base station apparatus 1A. With zero output, the base station apparatus 1A transmits ZP CSI-RS. The terminal apparatus 2A performs interference measurement in a resource to which the ZP CSI-RS corresponds, for example. Note that the resource for the interference measurement corresponding to the ZP CSI-RS is also referred to as a CSI-Interference Measurement (IM) resource.

The base station apparatus 1A transmits (configures) the NZP CSI-RS resource configuration for the resource of the NZP CSI-RS. The NZP CSI-RS resource configuration includes some or all of one or more NZP CSI-RS resource mapping, a CSI-RS resource configuration ID for each NZP CSI-RS resource, and the number of antenna ports. The CSI-RS resource mapping is information indicating an OFDM symbol and/or a subcarrier (e.g., a resource element) in a slot in which the CSI-RS resource is allocated. The CSI-RS resource configuration ID is used to identify the NZP CSI-RS resource.

The base station apparatus 1A transmits (configures) a CSI-IM resource configuration. The CSI-IM resource configuration includes one or more CSI-IM resource mapping, and a CSI-IM resource configuration ID for each CSI-IM resource. The CSI-IM resource mapping is information indicating an OFDM symbol or a subcarrier (e.g., a resource element) in a slot in which the CSI-IM resource is allocated. The CSI-IM resource configuration ID is used to identify the CSI-IM configuration resource.

The CSI-RS is also used to measure the received power, the received quality, or the SINR. The received power measured by the CSI-RS is also referred to as a CSI-RSRP, the received quality measured by the CSI-RS is also referred to as a CSI-RSRQ, and the SINR measured by the CSI-RS is also referred to as a CSI-SINR. Note that the CSI-RSRQ is a ratio between the CSI-RSRP and the RSSI.

The CSI-RS is transmitted periodically/non-periodically/semi-persistently.

With respect to the CSI, the terminal apparatus is configured by a higher layer. For example, there are a report configuration that is a configuration of a CSI report, a resource configuration that is a configuration of a resource for measuring the CSI, and a measurement link configuration for linking the report configuration and the resource configuration for the CSI measurement. One or more report configurations, resource configurations, and measurement link configurations are configured.

The report configuration includes some or all of a report configuration ID, a report configuration type, a codebook configuration, a CSI report amount, a block error rate target.

The report configuration ID is used to identify the report configuration. The report configuration type indicates a periodic/non-periodic/semi-persistent CSI report. The CSI report amount indicates the reported amount (value, type), e.g., some or all of the CRI, the RI, the PMI, the CQI, or the RSRP. The block error rate target is the target of the block error rate that is assumed in a case of calculating the CQI.

The resource configuration includes some or all of a resource configuration ID, a synchronization signal block resource measurement list, a resource configuration type, or one or more resource set configurations. The resource configuration ID is used to identify the resource configuration. The synchronization signal block resource configuration list is a list of resources in which the measurement using a synchronization signal is performed. The resource configuration type indicates whether the CSI-RS is transmitted periodically, non-periodically, or semi-persistently. Note that in the case of a configuration in which the CSI-RS is transmitted semi-persistently, the CSI-RS is periodically transmitted during a period since activated with the higher layer signaling or downlink control information until deactivated.

The resource set configuration includes some or all of pieces of information indicating a resource set configuration ID, resource repetition, or one or more CSI-RS resources. The resource set configuration ID is used to identify the resource set configuration. The resource repetition indicates the on/off of resource repetition within the resource set. In a case that the resource repetition is on, it means that the base station apparatus uses a transmission beam that is fixed (identical) in each of multiple CSI-RS resources in the resource set. In other words, in a case that the resource repetition is on, the terminal apparatus assumes that the base station apparatus is using a transmission beam that is fixed (identical) in each of multiple CSI-RS resources in the resource set. In a case that the resource repetition is off, it means that the base station apparatus does not use a transmission beam that is fixed (same) on each of multiple CSI-RS resources in the resource set. In other words, in a case that the resource repetition is off, the terminal apparatus assumes that the base station apparatus does not use a transmission beam that is fixed (identical) on each of multiple CSI-RS resources in the resource set. The information indicating the CSI-RS resource includes one or more CSI-RS resource configuration IDs, and one or more CSI-IM resource configuration IDs.

The measurement link configuration includes some or all of a measurement link configuration ID, the report configuration ID, and the resource configuration ID, and the report configuration and the resource configuration are linked. The measurement link configuration ID is used to identify the measurement link configuration.

The PT-RS is associated with a DMRS (DMRS port group). The number of antenna ports of the PT-RS is 1 or 2, and each PT-RS port is associated with a DMRS port group. The terminal apparatus assumes that the PT-RS port and the DMRS port are quasi co-location (QCL) with respect to delay spread, Doppler spread, Doppler shift, average delay, and spatial reception (Rx) parameters. The base station apparatus configures a PT-RS configuration by the higher layer signaling. In a case that the PT-RS configuration is configured, the PT-RS may be transmitted. The PT-RS is not transmitted in a case of a prescribed MCS (e.g., in a case that the modulation scheme is QPSK). The PT-RS configuration is configured with a time density and a frequency density. The time density indicates the time interval at which the PT-RS is allocated. The time density is indicated as a function of the scheduled MCS. The time density also includes no PT-RS present (transmitted). The frequency density indicates the frequency interval at which the PT-RS is allocated. The frequency density is indicated as a function of the scheduled bandwidth. The frequency density also includes no PT-RS present (transmitted). Note that in a case that the time density or frequency density indicates that no PT-RS is present (transmitted), no PT-RS is present (transmitted).

Multimedia Broadcast Multicast Service Single Frequency Network (MBSFN)

The RS is transmitted in the entire band of a subframe used for transmission of PMCH. MBSFN RS is used to demodulate PMCH. PMCH is transmitted through the antenna port used for transmission of MBSFN RS.

The PRS is transmitted in a subframe configured for the PRS transmission. The PRS is used for position measurement of the terminal apparatus. The PRS determines a resource that is allocated based on a cell ID. The PRS sequence is a pseudo-random sequence. The initial value of the pseudo-random sequence that generates the PRS sequence is calculated based on some or all of a slot number, an OFDM symbol number in a slot, a cell ID, an ID of a PRS, and a Cyclic Prefix (CP) length. The CP length is information indicating whether it is a normal CP or an extended CP longer than the normal CP.

Here, the downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

For terminal apparatuses that supports Carrier Aggregation (CA), the base station apparatus can integrate multiple Component Carriers (CCs) for transmission in a broader band to perform communication. In carrier aggregation, one Primary Cell (PCell) and one or more Secondary Cells (SCells) are configured as a set of serving cells.

In Dual Connectivity (DC), a Master Cell Group (MCG) and a Secondary Cell Group (SCG) are configured as a group of serving cells. MCG includes a PCell and optionally one or more SCells. SCG includes a primary SCell (PSCell) and optionally one or more SCells.

The terminal apparatus may be configured to operate in a part of a band of a serving cell (bandwidth part (BWP)). Multiple BWPs may be configured, and a BWP-ID is used to identify a BWP. Note that a BWP of the downlink is also referred to as a DL-BWP, and a BWP of the uplink is also referred to as an UL-BWP.

The base station apparatus can communicate by using a radio frame. The radio frame includes multiple subframes (sub-periods). In a case that a frame length is expressed in time, for example, a radio frame length can be 10 milliseconds (ms), and a subframe length can be 1 ms. In this example, the radio frame includes 10 subframes.

The slot includes 14 OFDM symbols. Since the OFDM symbol length may vary depending on the subcarrier spacing, the slot length may also vary depending on the subcarrier spacing. The minislot includes OFDM symbols that are less than the slot. The slot/minislot can be used as a scheduling unit. Note that the terminal apparatus can know a slot-based scheduling/minislot-based scheduling by the position (allocation) of the first downlink DMRS. In the slot-based scheduling, the first downlink DMRS is allocated to the third or fourth symbol of the slot. In the minislot-based scheduling, the first downlink DMRS is allocated to the first symbol of the scheduled data (resource, PDSCH). Note that the slot-based scheduling is also referred to as PDSCH mapping type A. The minislot-based scheduling is also referred to as PDSCH mapping type B.

The resource block is defined by 12 continuous subcarriers. The resource element is defined by an index of the frequency domain (e.g., a subcarrier index) and an index of the time domain (e.g., OFDM symbol index). The resource element is classified as an uplink resource element, a downlink element, a flexible resource element, and a reserved resource element. In the reserved resource element, the terminal apparatus does not transmit an uplink signal and does not receive a downlink signal.

Multiple Subcarrier spacings (SCSs) are supported. For example, the SCS is 15/30/60/120/240/480 kHz.

The base station apparatus/terminal apparatus can communicate in a licensed band or an unlicensed band. The base station apparatus/terminal apparatus can communicate with at least one SCell that operates in an unlicensed band by carrier aggregation with the licensed band serving as the PCell. The base station apparatus/terminal apparatus can communicate in dual connectivity in which the master cell group communicates in the licensed band and the secondary cell group communicates in the unlicensed band. The base station apparatus/terminal apparatus can communicate in the unlicensed band only by the PCell. The base station apparatus/terminal apparatus can communicate with the CA or DC only by the unlicensed band. Note that the licensed band serves as the PCell, and communication by assisting a cell of the unlicensed band (SCell, PSCell) by, for example, CA, DC, or the like, is also referred to as a Licensed-Assisted Access (LAA). The communication of the base station apparatus/terminal apparatus only in the unlicensed band is also referred to as an Unlicensed-standalone access (ULSA). The communication of the base station apparatus/terminal apparatus only in the licensed band is also referred to as a Licensed Access (LA).

Figure 2:
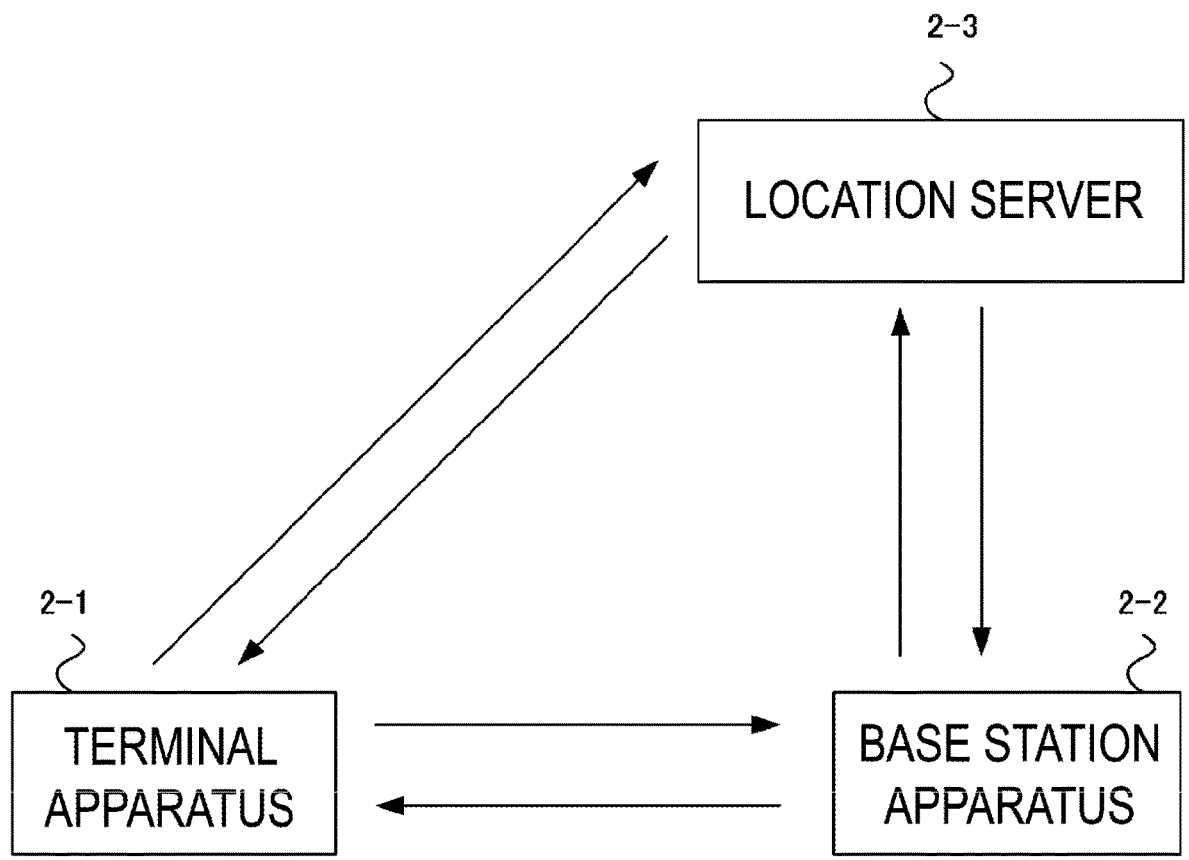
FIG. 2 is a diagram illustrating an example of a communication system according to the present embodiment.

FIG. 2 is a diagram illustrating an example of a communication system according to the present embodiment. As illustrated in FIG. 2, the communication system according to the present embodiment includes a terminal apparatus 2-1, a base station apparatus 2-2, a location server 2-3.

The terminal apparatus 2-1 transmits an uplink signal required for the position measurement of the uplink based terminal apparatus. The terminal apparatus 2-1 receives a downlink signal from the base station apparatus 2-2, and performs a position estimation or a measurement related to the position. The terminal apparatus 2-1 receives signals of a Global Navigation Satellite System (GNSS) or a Terrestrial Beacon System (TBS), and performs a measurement related to the position. The terminal apparatus 2-1 transmits the position estimation value or the position measurement result to the location server 2-3 or the base station apparatus 2-2. The position estimation value includes coordinate information. The coordinate information is latitude, longitude, altitude (sea level), and the like. The position measurement result is information used by the location server 2-3 to determine the position estimation value.

The base station apparatus 2-2 communicates the measurement result of the radio signal to the target terminal apparatus with the location server 2-3. The base station apparatus 2-2 can request the terminal apparatus 2-1 to perform the SRS transmission in order to perform the position measurement of the uplink.

The location server 2-3 estimates the position of the terminal apparatus or transmits assist data for position measurement to the terminal apparatus. The location server 2-3 can operate with the base station apparatus 2-2 to obtain the position estimation value of the terminal apparatus 2-2.

The communication system according to the present embodiment uses one or more position estimation methods such as Observed Time Differential Of Arrival (OTDOA), Enhanced Cell ID (ECID), and Uplink Time Differential Of Arrival (UTDOA) to estimate the position of the terminal apparatus. Using these methods, the terminal apparatus 2-1, the base station apparatus 2-2, or the location server 2-3 estimates the position of the terminal apparatus 2-1. The location server 2-3 manages the position information of the terminal apparatus 2-1.

The OTDOA is a position estimation method of the downlink, in which the reception timings of the downlink signals from multiple base station apparatuses are used to estimate the position of the terminal apparatus 2-1. The location server 2-3 transmits (conveys) OTDOA assistance information to the terminal apparatus 2-1. The OTDOA assistance information includes some or all of OTDOA reference cell information, OTDOA neighbor cell information list, and OTDOA errors. The OTDOA reference cell information includes some or all of a carrier frequency, the cell ID, the CP length, and PRS information. The CP length indicates a normal CP or an extended CP longer than a normal CP. The PRS information includes some or all of a bandwidth, a PRS configuration index, the number of continuous subframes (slots), bit map information indicating the subframe (slot) in which the PRS is transmitted, and PRS muting information. The PRS configuration index is information indicating the period of a PRS subframe (slot) and the offset value of a PRS subframe (slot). The bandwidth indicates the bandwidth in which the PRS is transmitted, and is indicated by the number of resource blocks. For example, the number of resource blocks indicating the bandwidth is 6, 15, 25, 50, 75, or 100. The number of continuous subframes (slots) indicates the number of PRS subframes (slots) that are continuously transmitted. For example, the number of subframes (slots) that are continuously transmitted may vary depending on the frequency range (frequency band). Based on the period of the PRS subframe and the offset value of the PRS subframe (slot), the leading subframe (slot) of the continuous subframes (slots) is determined. The PRS muting information indicates a PRS muting configuration of the cell. The PRS muting configuration indicates whether the PRS is transmitted or not transmitted in a certain subframe (slot) of a certain cell.

The OTDOA neighbor cell information list includes one or more pieces of OTDOA neighbor frequency information. The OTDOA neighbor frequency information includes one or more pieces of OTDOA neighbor cell information. The OTDOA neighbor cell information includes some or all of a cell ID, a carrier frequency, a CP length, a PRS information, a slot number offset, a PRS subframe offset, an expected RSTD, and an expected RSTD uncertainty. The slot number offset indicates the offset of the slot number between the cell and the reference cell. The PRS subframe offset indicates the offset between the beginning of the PRS subframe of the reference cell and the beginning of the PRS subframe at a carrier frequency different from the reference cell. A Reference Signal Time Difference (RSTD) indicates a difference in reception timing between the neighbor cell and the reference cell. The reception timing is the beginning of the subframe (slot). The expected RSTD is considered the expected propagation time difference between the cell and the reference cell. The expected RSTD uncertainty indicates the possible value (error) of the expected RSTD. The terminal apparatus 2-1 can measure the RSTD in a range determined based on the expected RSTD and expected RSTD uncertainty.

The location server 2-3 requests OTDOA information for the base station apparatus 2-2. Conversely, in a case that the base station apparatus 2-2 is requested from the location server 2-3, the base station apparatus 2-2 transmits (provides) the OTDOA information to the location server 2-3. The OTDOA information includes one or more pieces of OTDOA cell information. The OTDOA cell information includes some or all of a physical cell ID, a carrier frequency, a PRS bandwidth, a PRS configuration index, a CP length, the number of continuous subframes (slots) in which the PRS is transmitted, bit map information indicating a subframe (slot) in which the PRS is transmitted, coordinates of the antennas of the base station apparatus/access point, and the PRS muting configuration. The coordinates of the antennas of the base station apparatus/access point indicate some or several of latitude, longitude, height (sea level, altitude), information indicating north latitude or south latitude, and information indicating the direction of the height. The direction of the height indicates height or depth.

The terminal apparatus 2-1 transmits (conveys) OTDOA signal measurement information to the location server 2-3. The OTDOA signal measurement information includes some or all of a cell ID of the reference cell, a carrier frequency, and a neighbor measurement list. The neighbor measurement list is a list including RSTDs for neighbor cells, and includes one or more neighbor measurement elements. The neighbor measurement elements include some or all of a cell ID of a neighbor cell, a carrier frequency, and a RSTD.

The location server 2-3 can estimate the position of the terminal apparatus 2-1 by using the OTDOA signal measurement information received (provided) from the terminal apparatus 2-1.

The UTDOA is an uplink position estimation, and estimates the position of the terminal apparatus 2-1 by using, for example, the reception timing of an uplink signal from the terminal apparatus 2-1 in multiple base station apparatuses. The base station apparatus 2-2 transmits (conveys) some or all of a cell ID, timing advance, and SRS information to the location server 2-3. The SRS information includes some or all of a cell ID, an uplink cyclic prefix, an uplink bandwidth of the cell, a bandwidth of the cell-specific SRS, a bandwidth of the UE-specific SRS, the number of antenna ports of the SRS, a frequency hopping bandwidth of the SRS, a cyclic shift of the SRS, a transmission comb of the SRS, and allocation information in the frequency domain. The transmission comb of the SRS indicates the allocation information at a subcarrier level. The base station apparatus 2-2 transmits SRS information to the terminal apparatus 2-1.

The terminal apparatus 2-1 transmits (conveys) the capability of the supported position estimation method to the location server 2-3 in accordance with the request by the location server 2-3. In a case that the terminal apparatus 2-1 supports the OTDOA, the terminal apparatus 2-1 transmits (conveys) the supported system bandwidth included in the capability.

Figure 3:
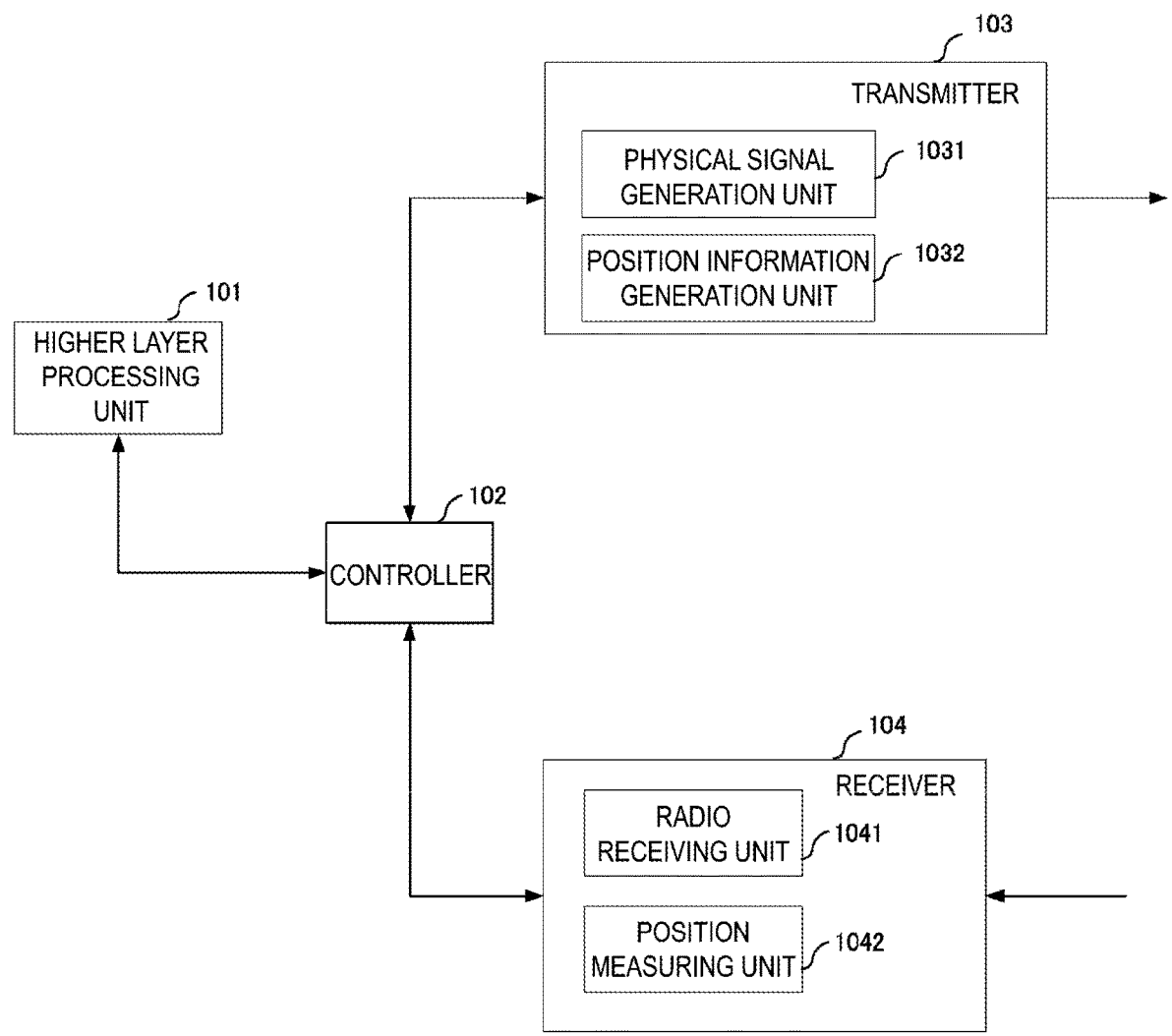
FIG. 3 is a block diagram illustrating a configuration example of a base station apparatus according to the present embodiment.

FIG. 3 is a schematic block diagram illustrating a configuration example of the base station apparatus according to the present embodiment. As illustrated in FIG. 3, the base station apparatus 1A includes a higher layer processing unit (higher layer processing step) 101, a controller (controlling step) 102, a transmitter (transmitting step) 103, a receiver (receiving step) 104, and a position measuring unit (position measuring step) 105. The transmitter 103 includes a physical signal generation unit (physical signal generating step) 1031 and a position information generation unit (position information generating step) 1032. Although not illustrated, the transmitter 103 may include a transmit antenna. Although not illustrated, the receiver 105 may include a receive antenna. The transmit antenna and the receive antenna may be the same antenna.

The higher layer processing unit 101 performs processing of a Medium Access Control (MAC) layer, a Packet Data Convergence Protocol (PDCP) layer, a Radio Link Control (RLC) layer, and a Radio Resource Control (RRC) layer. The higher layer processing unit 101 generates information necessary for control of the transmitter 103 and the receiver 104, and outputs the generated information to the controller 102.

The higher layer processing unit 101 receives information of a terminal apparatus, such as a capability of the terminal apparatus (UE capability), from the terminal apparatus. To rephrase, the terminal apparatus transmits its function to the base station apparatus by higher layer signaling.

Note that in the following description, information of a terminal apparatus includes information for indicating whether the terminal apparatus supports a prescribed function, or information for indicating that the terminal apparatus has completed the introduction and test of a prescribed function. Note that, in the following description, information of whether the prescribed function is supported includes information of whether the introduction and test of the prescribed function have been completed.

For example, in a case that a terminal apparatus supports a prescribed function, the terminal apparatus transmits information (parameters) for indicating whether the prescribed function is supported. In a case that a terminal apparatus does not support a prescribed function, the terminal apparatus does not transmit information (parameters) for indicating whether the prescribed function is supported. In other words, whether the prescribed function is supported is notified by whether information (parameters) for indicating whether the prescribed function is supported is transmitted. The information (parameters) for indicating whether the prescribed function is supported may be notified by using one bit of 1 or 0.

The higher layer processing unit 101 generates, or acquires from a higher node, the downlink data (the transport block), system information, the RRC message, the MAC Control Element (CE), and the like. The higher layer processing unit 101 outputs the downlink data to the transmitter 103, and outputs other information to the controller 102. The higher layer processing unit 101 manages various kinds of configuration information of the terminal apparatus.

The higher layer processing unit 101 determines a frequency and a subframe (slot) to which the physical channels are allocated, the coding rate and modulation scheme (or MCS) for the physical channels, the transmit power, and the like. The higher layer processing unit 101 outputs the determined information to the controller 102.

The higher layer processing unit 101 generates information to be used for scheduling the physical channels, based on the result of the scheduling. The higher layer processing unit 101 outputs the generated information to the controller 102.

Based on the information input from the higher layer processing unit 101, the controller 102 generates a control signal for controlling the transmitter 103 and the receiver 104. The controller 102 generates the downlink control information based on the information input from the higher layer processing unit 101, and outputs the generated information to the transmitter 103.

The transmitter 103 generates the downlink reference signal in accordance with the control signal input from the controller 102, encodes and modulates the HARQ indicator, the downlink control information, and the downlink data that are input from the higher layer processing unit 101, multiplexes the downlink physical channel and the downlink reference signal, and transmits a signal obtained through the multiplexing to the terminal apparatus 2 through a transmit and/or receive antenna 105.

A physical signal generation unit 1031 generates an OFDM signal from the HARQ indicator input from the higher layer processing unit 101, the downlink control information, the downlink reference signal, and the downlink data. The OFDM signal adds cyclic prefixes (CPs) to generate a baseband digital signal. The baseband digital signal is converted to an analog signal, filtered to remove excess frequency components, up-converted to the carrier frequency, power amplified, and transmitted from the transmit antenna.

A position information generation unit 1032 generates a signal for transmitting (conveying) the position measured (estimated) by the receiver 104 to the location server. The transmitter 103 communicates with the location server in a wired or wireless manner.

In accordance with the control signal input from the controller 102, a radio receiving unit 1041 demultiplexes, demodulates, and decodes the reception signal received from the terminal apparatus, and outputs information resulting from the decoding to the higher layer processing unit 101 or a position measuring unit 1042. The position measuring unit 1042 performs the position measurement from the reference signal for the position measurement received from the terminal apparatus.

The radio receiving unit 1041 converts, by down-converting, an uplink signal received through the receive antenna into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 1041 removes a portion corresponding to CP from the digital signal resulting from the conversion. The radio receiving unit 1041 performs Fast Fourier Transform (FFT) on the signal from which the CPs have been removed, and extracts a signal in the frequency domain. The signal in the extracted frequency domain is separated into a signal such as an uplink physical channel, and an uplink reference signal. The radio receiving unit 1041 outputs a signal related to the position estimation to the position measuring unit 1042.

Figure 4:
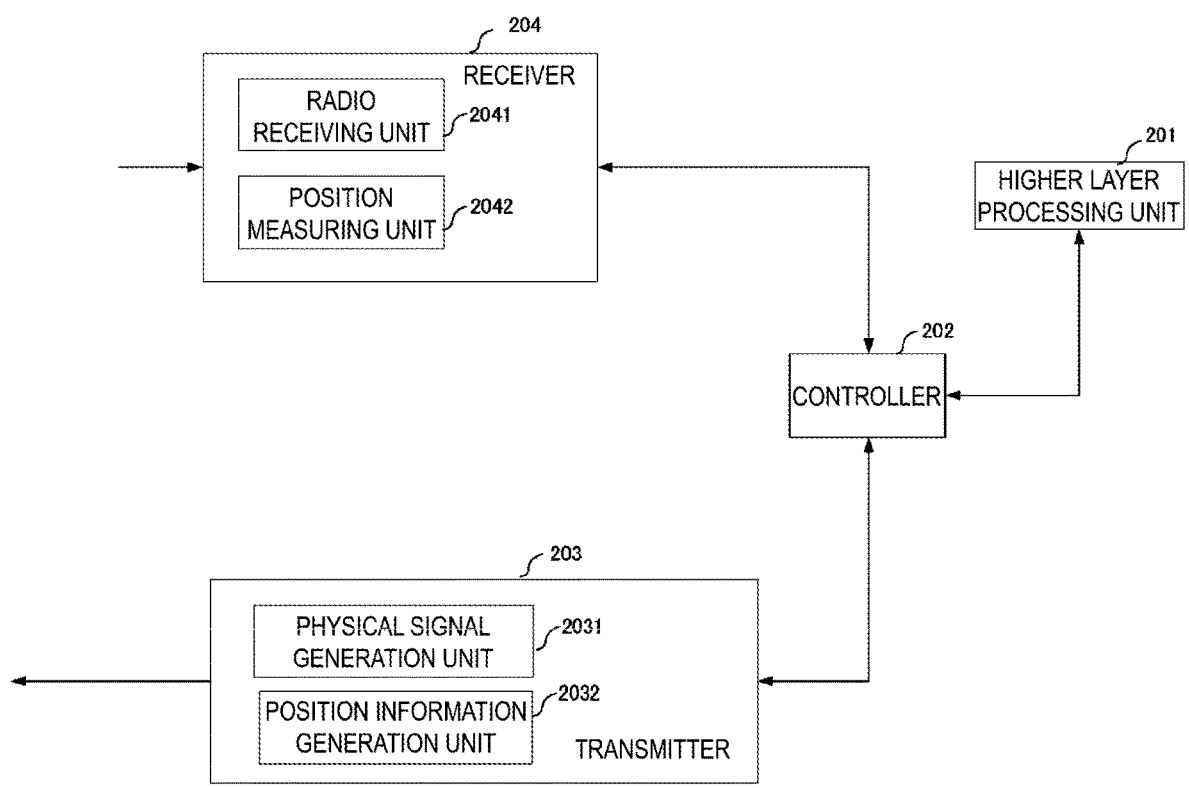
FIG. 4 is a block diagram illustrating a configuration example of a terminal apparatus according to the present embodiment.
Figure 8:
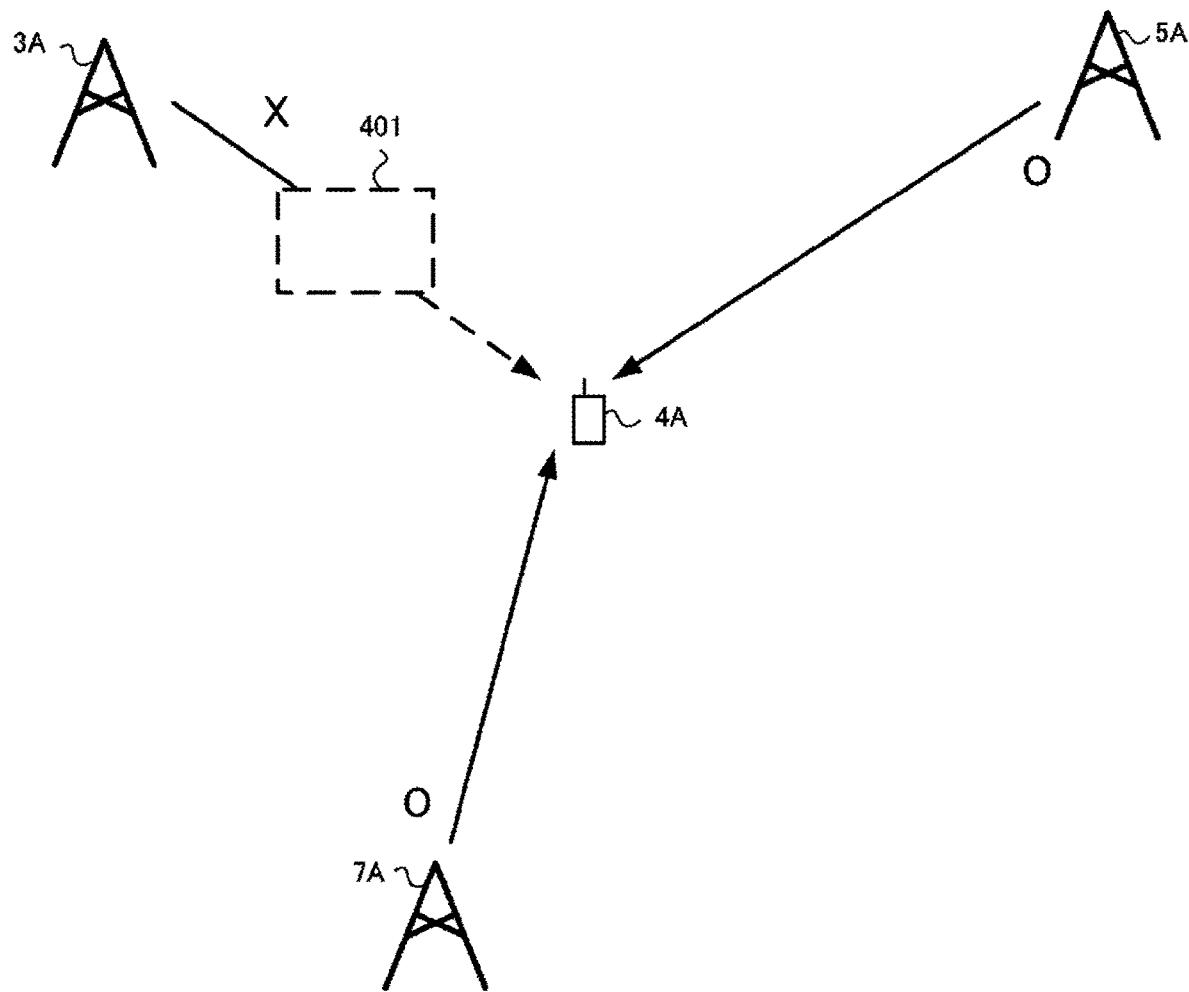
FIG. 8 is a diagram illustrating an example of received power between a base station apparatus and a terminal apparatus according to the present embodiment.

FIG. 4 is a schematic block diagram illustrating a configuration of the terminal apparatus according to the present embodiment. As illustrated in FIG. 8, the terminal apparatus includes a higher layer processing unit (higher layer processing step) 201, a controller (controlling step) 202, a transmitter (transmitting step) 203, and a receiver (receiving step) 204. The transmitter 203 includes a physical signal generation unit (physical signal generating step) 2031 and a position information generation unit (position information generating step) 2032. The receiver 204 includes a radio receiving unit (radio receiving step) 2041, and a position measuring unit (position measuring step) 2042.

The higher layer processing unit 201 outputs, to the transmitter 203, the uplink data (the transport block) generated by a user operation or the like. The higher layer processing unit 201 performs processing of a Medium Access Control (MAC) layer, a Packet Data Convergence Protocol (PDCP) layer, a Radio Link Control (RLC) layer, a Radio Resource Control (RRC) layer, and the like.

The higher layer processing unit 201 outputs, to the transmitter 203, information for indicating a terminal apparatus function supported by the terminal apparatus 2A.

The higher layer processing unit 201 manages various kinds of configuration information of the terminal apparatus itself. The higher layer processing unit 201 generates information to be mapped to each uplink channel, and outputs the generated information to the transmitter 203.

The higher layer processing unit 201 interprets the downlink control information received through the receiver 204, and determines scheduling information. The higher layer processing unit 201 generates control information in order to control the receiver 204 and the transmitter 203 in accordance with the scheduling information, and outputs the generated information to the controller 202.

The higher layer processing unit 201 interprets the assist data (information) related to the position measurement from the location server 2-3 and outputs the information to the controller 202.

Based on the information input from the higher layer processing unit 201, the controller 202 generates a control signal for controlling the receiver 204, and the transmitter 203. The controller 202 outputs the generated control signal to the receiver 204 and the transmitter 203 to control the receiver 204 and the transmitter 203.

In accordance with the control signal input from the controller 202, the receiver 204 demultiplexes, demodulates, and decodes a reception signal received from the base station apparatus through the receive antenna, and outputs the resulting information to the higher layer processing unit 201.

The radio receiving unit 2041 converts, by down-converting, a downlink signal received through the transmit and/or receive antenna 206 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 2041 removes a portion corresponding to CP from the digital signal resulting from the conversion, performs fast Fourier transform of the signal from which the CP has been removed, and extracts a signal in the frequency domain. The extracted signal is separated into each of a downlink physical channel and a downlink reference signal. The radio receiving unit 2041 performs channel compensation for the downlink physical channel based on a channel estimation value of a desired signal obtained from channel measurement, detects downlink control information, and outputs the detected downlink control information to the controller 202.

The radio receiving unit 2041, by using the channel estimation value, detects a signal, and outputs the detected signal to the higher layer processing unit 201.

The position measuring unit 2042 determines the position estimation value or the position measurement result by using one or more position estimation methods and outputs the result to the controller 202. The position measuring unit 2042 determines the position estimation value or the position measurement result by using the assist data for the position estimation and outputs the result to the controller 202.

The transmitter 203 generates an uplink reference signal in accordance with the control signal input from the controller 202, encodes and modulates the uplink data (the transport block) input from the higher layer processing unit 201, multiplexes the uplink physical channel such as a control channel and a shared channel, and the generated uplink reference signal, and transmits a signal resulting from the multiplexing to the base station apparatus through the transmit antenna.

The transmitter 203 transmits (conveys) the position estimation value or the position measurement result to the location server 2-3.

The physical signal generation unit 2031 generates an OFDM symbol from the uplink control information, the uplink data, and the uplink reference signal. The OFDM symbol is added with CP, and a digital signal in the baseband is generated. The baseband digital signal is converted to an analog signal, removed of excess frequency components, converted to the carrier frequency by up-converting, power amplified, and transmitted.

Note that the terminal apparatus can perform modulation according to the SC-FDMA scheme.

Figure 5:
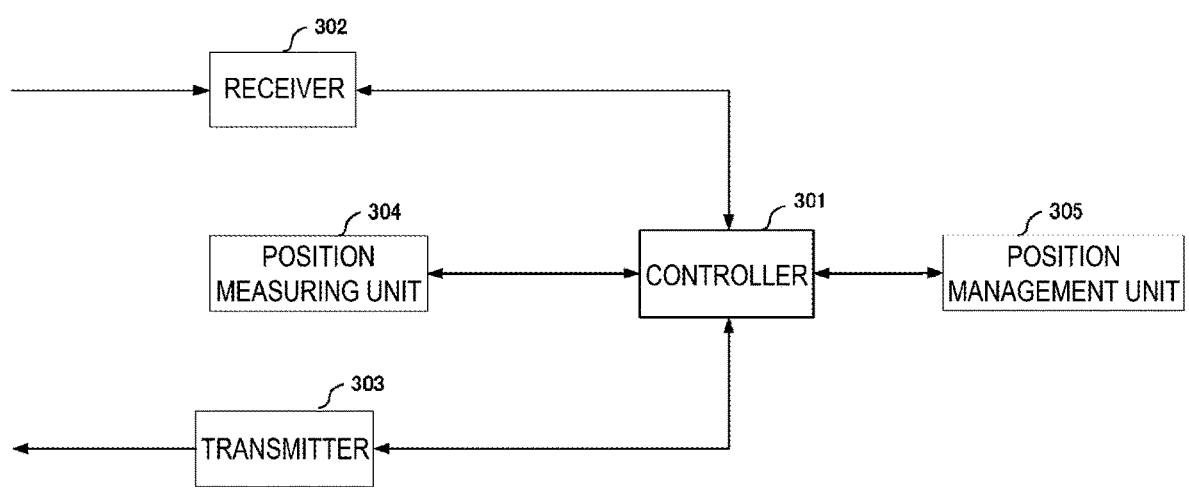
FIG. 5 is a block diagram illustrating a configuration example of a location server according to the present embodiment.

FIG. 5 is a schematic block diagram illustrating a configuration example of the location server 2-3. The location server 2-3 includes a controller (controlling step) 301, a receiver (receiving step) 302, a transmitter (transmitting step) 303, a position measuring unit (position measuring step) 304, and a position management unit (position management step) 305.

The controller 301 controls the receiver 302, the transmitter 303, the position measuring unit 304, and the position management unit 305.

The receiver 302 receives a position estimation value or position measurement result from the base station apparatus and/or the terminal apparatus, and outputs the result to the controller 301. The controller 301 outputs the position measurement result to the position measuring unit 304. The position measuring unit 304 determines the position estimation value by using the position measurement result, and outputs the position estimation value to the controller 301. The controller 301 outputs the position estimation value input from the receiver 302 or the position measuring unit 304 to the position management unit 305.

The controller 301 outputs the assist data (information) for the position estimation to the transmitter 303. The transmitter 303 transmits (conveys) the assist data (information) related to the position estimation to the terminal apparatus.

In order to improve the position estimation accuracy, improvements in the detection accuracy of the pathloss (Line of Sight (LOS) path) of the base station apparatus and the terminal apparatus are effective. For example, a narrow beamforming with multiple antennas may improve position estimation accuracy.

For example, the (analog) beamforming (filter of the spatial domain) can increase the power of the channel in a prescribed direction by directing the beam in the direction. However, in a state in which the base station apparatus does not know the position (coordinates) of the terminal apparatus, the base station apparatus does not know the direction of the terminal apparatus. Accordingly, the reference cell or neighbor cell transmits multiple PRSs beam-formed in different beam directions, the terminal apparatus selects a suitable one from the multiple PRSs and determines the RSTD. As a result, the detection accuracy of the pathloss can be improved, and the position estimation accuracy can be improved.

Note that the PRS transmitted in different beamforming is multiplexed in the time domain or the frequency domain. The PRS transmitted in beamforming is also referred to as a PRS resource or PRS block. The resource (resource element, slot, subframe) on which the PRS resource (PRS block) is allocated may be included in the OTDOA information/OTDOA assistance information or PRS information described above. An indicator (index) indicating a PRS resource (PRS block) is also referred to as a PRS Resource Indicator (PRI) or PRS index.

Figure 6:
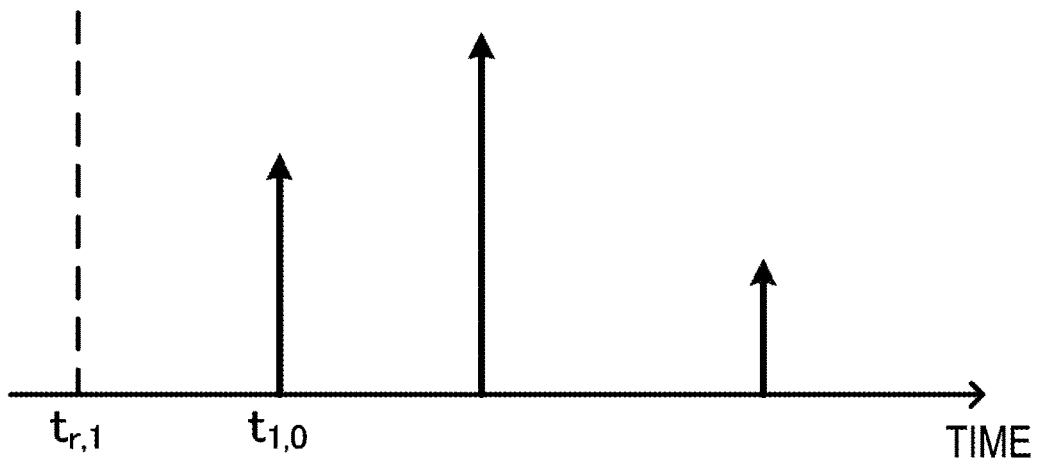
FIG. 6 is a diagram illustrating an example of reception timing in multiple PRS resources according to the present embodiment.
Figure 6:
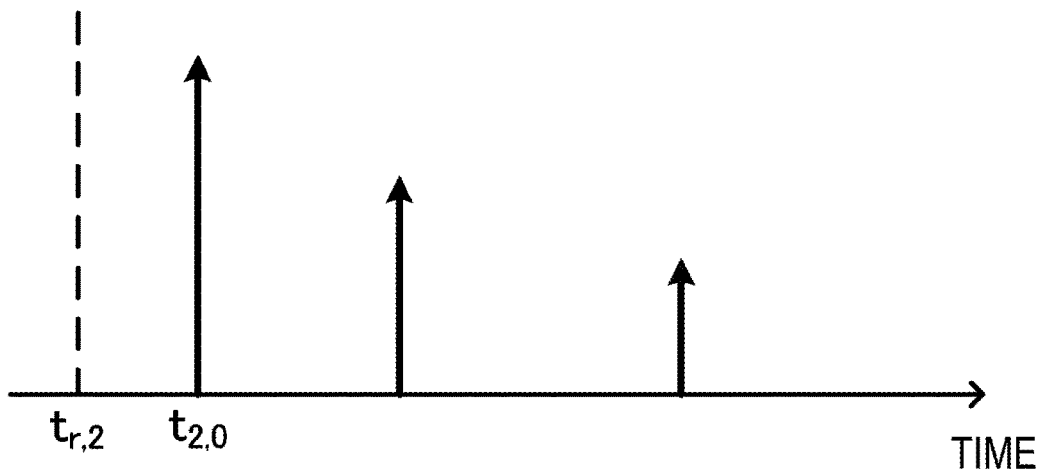
Figure 6:
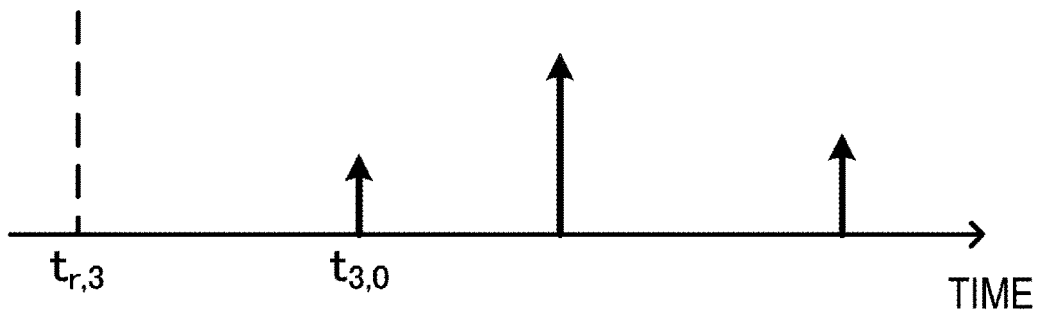

FIG. 6 is an example of reception timing (reception time) detected by the terminal apparatus in a case that the PRS is transmitted in three different beamforming in a certain cell. In the figure, each of $t_{r,1}$, $t_{r,2}$, and $t_{r,3}$ indicates a reference timing for the first PRS resource, the second PRS resource, and the third PRS resource, respectively. The reference timing of the PRS resource can be represented by, for example, the frame, the slot, the subframe, and the boundary (beginning) of the OFDM symbol. Each of $t_{1,0}$, $t_{2,0}$, and $t_{3,0}$ indicates the optimal reception timing detected by the first PRS resource, the optimal reception timing detected by the second PRS resource, and the optimal reception timing detected by the third PRS resource, respectively. At this time, $t_{1,0} - t_{r,1}$ is the propagation delay time estimated by the first PRS resource. For this reason, the terminal apparatus can determine that the LOS path is likely to be detectable in the PRS resource where the propagation delay time estimated from the first to third PRS resources is minimal. At this time, the terminal apparatus can select the PRS resource determined to have a suitable reception timing on each of the reference cell and the neighbor cell, and calculate the RSTD to improve the position estimation accuracy. Note that the transmission timing of each PRS resource may be different, so the PRI of the reference cell and the PRI of the neighbor cell used in the calculation of RSTD are reported to the location server.

The terminal apparatus can report the error of the optimal reception timing between the PRS resources to the location server. The error of the optimal reception timing between PRS resources is, for example, the difference between the optimal reception timing $t_{2,0}$ of the second PRS resource and the optimal reception timing $t_{1,0}$ for the first PRS resource, and the difference between the optimal reception timing $t_{2,0}$ of the second PRS resource and the optimal reception timing $t_{3,0}$ of the third PRS resource.

Figure 7:
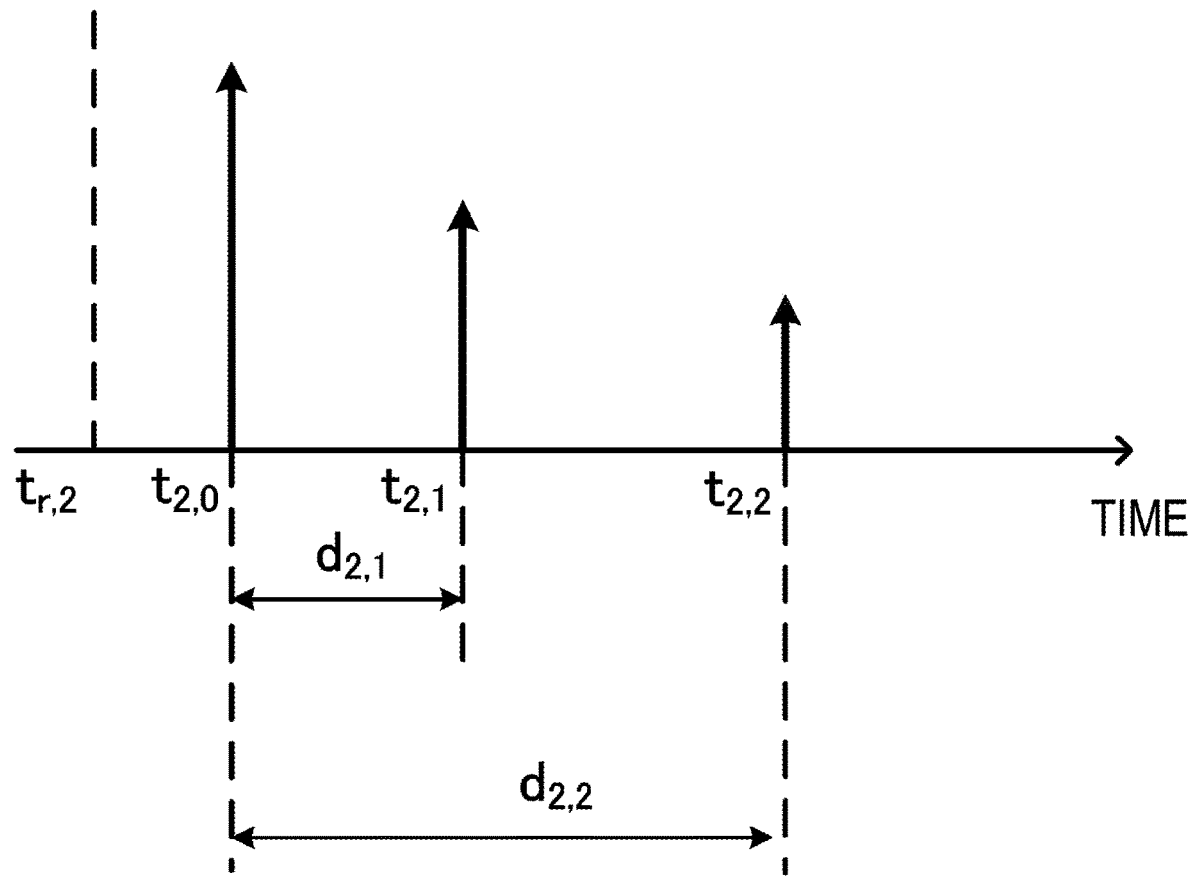
FIG. 7 is a diagram illustrating an example of reception timing in a PRS resource according to the present embodiment.

Note that in addition to the RSTD, the timing other than the optimal reception timing can be reported to the location server in consideration of the error in the optimal reception timing used in the calculation of the RSTD. FIG. 7 is an example of the second PRS resource. The terminal apparatus can report, to the location server, the time difference $d_{2,1}$ between the optimal reception timing $t_{2,0}$ and the reception timing $t_{2,1}$ of the second PRS resource, and the time difference $d_{2,2}$ between the optimal reception timing $t_{2,0}$ and the reception timing $t_{2,2}$ of the second PRS resource. This makes it possible to improve the position estimation accuracy by increasing candidates.

Beamforming is also effective in estimating the transmission direction and reception direction since the beamforming has a narrow beam width in a case of using a large number of antennas. In addition to the distance due to the propagation delay time, the position estimation accuracy can be improved in a case that the direction is known.

For example, suppose that the base station apparatus or the location server knows the position information of the terminal apparatus by a prescribed method. At this time, since the base station apparatus knows the direction of the terminal apparatus, it is possible to improve the position estimation accuracy of the terminal apparatus by transmitting the PRS beam-formed in the direction of the terminal apparatus. Note that in a case that the reception beam direction of the terminal apparatus is not appropriate, the received power of the PRS may be reduced, and the detection accuracy of the reception timing may not be sufficient. Thus, in a case that the base station apparatus transmits multiple PRS resources to which the same transmission beamforming is applied, and the terminal apparatus receives multiple PRS resources in different reception beam directions, and determines the RSTD with a suitable PRS resource, the position estimation accuracy is improved. The terminal apparatus reports the PRI and RSTD to the base station apparatus or the location server. Note that in order to determine whether multiple PRS resources apply the same transmission beamforming (transmission filter in the spatial domain) or configure different transmission beamforming (transmission filter of the spatial domain), the OTDOA information/OTDOA assistance information or PRS information can include information indicating whether the same transmission beamforming is applied or different transmission beamforming is configured. The information indicating whether the same transmission beamforming is applied or different transmission beamforming is configured may be QCL information for the PRS resource. In other words, in a case that QCL is configured for multiple PRS resources, the terminal apparatus can determine that the same transmission beamforming is applied to the multiple PRSs. Note that in a case that one PRS resource is configured, the information indicating whether the same transmission beamforming is applied or different transmission beamforming is configured may indicate whether or not a transmission beamforming (a transmission filter in a spatial domain) is applied to the PRS.

The maximum number of PRSs (or PRS resources) transmitted within a prescribed time period may vary depending on the subcarrier spacing configured to the PRS.

As illustrated in FIG. 8, as a result of reception beam scanning, the received power of the PRS may be small, such as by blocking of a person or an object. FIG. 8 is an example in which base station apparatuses 3A, 5A, and 7A performs beamforming in the direction of the terminal apparatus 4A. There is an obstacle 401 between the base station apparatus 3A and the terminal apparatus 4A, and the received power is significantly reduced. Since the base station apparatuses 5A and 7A are not hindered, sufficient received power is obtained. Accordingly, in the example illustrated in FIG. 8, the location server estimates the position of the terminal apparatus 4A from the base station apparatuses 5A and 7A without using the base station apparatus 3A in calculation. In a case that the received power of the PRS is less than or equal to a threshold value as a result of the reception beam scanning, the terminal apparatus reports, to the base station apparatus or the location server, information indicating that the received power of the PRS is small. The location server can improve the position estimation accuracy by determining that the base station apparatus with the power of the LOS path being small has a large error based on the report from the terminal apparatus and excluding it from the calculation of the position estimation. Note that whether or not the received power of the PRS exceeds the threshold value is reported for each reference cell and neighbor cell. In a case that the received power of the PRS of the reference cell is smaller than the threshold value, the terminal apparatus may not report the RSTD. In a case that the received power of the PRS of the reference cell is greater than the threshold value, the terminal apparatus may report the PRIs and RSTDs of neighbor cells in which the received power of the PRS is greater than the threshold value, from among one or multiple neighbor cells. Note that the small received power of the PRS can be determined by a difference (ratio) from the maximum received power received by the terminal apparatus. The small received power of the PRS can be determined by the difference (ratio) from the received power of the PRS transmitted from the base station apparatus (for example, the reference cell) serving as a reference.

The threshold value of the received power for the PRS can be configured for each frequency band in which the PRS is transmitted. The base station apparatus can classify the frequency band to transmit the PRS into two of a low frequency range (FR1) and a high frequency range (FR2). For example, FR1 is from 450 MHz to 6 GHz, and FR2 is from 24.25 GHz to 52.6 GHz. The method for reporting that the received power of the PRS is small can be performed only for PRS transmitted in the FR2. This is because the PRS transmitted in the FR2 is strongly affected by blocking. On the other hand, this is because the PRS transmitted by the FR1 may be unable to be correctly recognized the effect of blocking by the terminal apparatus due to the effect of multipath or the like.

The PRS used for the position estimation includes multiple PRSs transmitted based on different frame formats. For example, a PRS transmitted at subcarrier spacing of 60 kHz and a PRS transmitted at subcarrier spacing of 15 kHz can both be used for signal processing for position estimation at a certain prescribed time. In this case, the PRS with the subcarrier spacing of 15 kHz includes a PRS transmitted in the LTE frame format. In other words, the terminal apparatus according to the present embodiment can perform position estimation on multiple base station apparatuses simultaneously connected by DC.

Note that the base station apparatus that transmits the PRS used for the position estimation is required to be stationary at least until the terminal apparatus receives a reception time (timing) difference for the multiple PRSs. In other words, the terminal apparatus obtains the RSTD assuming that the position (coordinates) of the base station apparatus does not change in the period in which the RSTD is measured from the base station apparatus. The base station apparatus or the location server can notify the terminal apparatus of the possibility that the base station apparatus moves. In a case that the base station apparatus moves, the base station apparatus or the location server can notify the terminal apparatus of a route to be moved, a movement speed, and the like. In this case, the terminal apparatus can know the position information (coordinates) of the base station apparatus from the reception time. In a case that the base station apparatus according to the present embodiment moves, the PRS may not be transmitted.

Beamforming can improve position estimation accuracy even in UTDOA. In the UTDOA, the terminal apparatus transmits the SRS. Note that, suppose that the terminal apparatus knows the position information of the base station apparatus and the terminal apparatus itself by a prescribed method. The terminal apparatus transmits multiple SRS resources in the same transmission beam direction. The base station apparatus reports the reception timing of the most LOS-like SRS resource to the location server along with the SRI.

Note that the frequency band used by the communication apparatus (base station apparatus and terminal apparatus) according to the present embodiment is not limited to the licensed bands and unlicensed bands described heretofore. Frequency bands to which the present embodiment is directed include frequency bands referred to as white bands (white spaces) that are not actually used for the purpose of preventing radio interference between frequencies or the like (e.g. frequency bands that are allocated for television broadcasting but are not used in some regions) or shared frequency bands (licensed shared bands) that have been exclusively allocated to a particular operator, but are expected to be shared by multiple operators in the future, even though the permission of the use is given to a specific service from the country or the region.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. The "computer-readable recording medium" may be any of a semiconductor recording medium, an optical recording medium, a magnetic recording medium, a medium dynamically retaining the program for a short time, or any other computer readable recording medium.

Each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. In a case that with advances in semiconductor technology, a circuit integration technology appears that replaces the present integrated circuits, it is also possible to use a new integrated circuit based on the technology according to one or more aspects of the present invention.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. A configuration in which constituent elements, described in the respective embodiments and having mutually the same effects, are substituted for one another is also included in the technical scope of the present invention.

INDUSTRIAL APPLICABILITY

The present invention is suitable for use in terminal apparatuses, location servers, and methods.

The invention claimed is:

1. A terminal apparatus configured to perform positioning measurement, comprising:
a receiver configured to:
receive a positioning reference signal (PRS) resource configuration from a location server;
receive a first resource from a serving cell based on the PRS resource configuration; and
receive a second PRS resource from a neighboring cell based on the PRS resource configuration; and
a position measuring unit configured to:
determine a reference signal time difference (RSTD) at least based on one of a reception timing of the first PRS resource and a reception timing of the second PRS resource;
wherein the first PRS resource is configured with a first subcarrier spacing and the second PRS resource is configured with a second subcarrier spacing;
the first PRS resource is configured with a first Quasi co-located (QCL) information for determining a first spatial receiving filter for receiving the first PRS resource by the terminal apparatus;
the second PRS resource is configured with a second QCL information for determining a second spatial receiving filter for receiving the second PRS resource by the terminal apparatus;
the first QCL information being different from the second QCL information.

2. The terminal apparatus according to claim 1, wherein the first PRS resource and the second PRS resource are repeated for a plurality of time with respective QCL information unchanged.

3. The terminal apparatus according to claim 1, wherein a value of the first subcarrier spacing is different from a value of the second subcarrier spacing.

4. The terminal apparatus according to claim 1, the first PRS resource and the second PRS resource are transmitted based on different radio access technologies.

5. A positioning measurement method performed by a terminal apparatus, comprising:
   receiving, from a location server, a positioning reference signal (PRS) resource configuration;
   receiving, from a serving cell based on the PRS resource configuration, a first PRS resource; and
   receiving, from a neighboring cell based on the PRS resource configuration, a second PRS resource; and
   determining,
   a reference signal time difference (RSTD) at least based on one of a reception timing of the first PRS resource and a reception timing of the second PRS resource;
   wherein the first PRS resource is configured with a first subcarrier spacing and the second PRS resource is configured with a second subcarrier spacing;
   the first PRS resource is configured with a first Quasi co-located (QCL) information for determining a first spatial receiving filter for receiving the first PRS resource by the terminal apparatus;
   the second PRS resource is configured with a second QCL information for determining a second spatial receiving filter for receiving the second PRS resource by the terminal apparatus;
   the first QCL information being different from the second QCL information.

6. The method according to claim 5, wherein the first PRS resource and the second PRS resource are repeated for a plurality of time with respective QCL information unchanged.

7. The method according to claim 5, wherein a value of the first subcarrier spacing is different from a value of the second subcarrier spacing.

8. The method according to claim 5, the first PRS resource and the second PRS resource are transmitted based on different radio access technologies.

9. A method for positioning a terminal apparatus performed by a location server, comprising:
   receiving, from a base station, a first positioning reference signal (PRS) configuration for a first base station transmit point and a second PRS configuration for a second base station transmit point; and
   transmitting, to the terminal apparatus, a third PRS configuration, wherein, the third PRS configuration includes:
   a first PRS resource determined from the first PRS configuration, the first PRS resource is configured with a first subcarrier spacing and a first Quasi co-located (QCL) information; and
   a second PRS resource determined from the second PRS configuration, the second PRS resource is configured with a second subcarrier spacing and a second QCL information.

10. The location server according to claim 9, wherein the first PRS resource and the second PRS resource are repeated for a plurality of time with respective QCL information unchanged.

11. The location server according to claim 9, wherein a value of the first subcarrier spacing is different from a value of the second subcarrier spacing.

12. The location server according to claim 9, wherein the first PRS resource and the second PRS resource are transmitted based on different radio access technologies.

\* \* \* \* \*